United States Patent [19]

Langsdorf et al.

[11] 4,007,337
[45] Feb. 8, 1977

[54] ARRANGEMENT AND METHOD OF ACHIEVING A DIAL PULSE MUTING FUNCTION IN A REGISTER SENDER PABX SYSTEM

[75] Inventors: Lloyd L. Langsdorf, Streamwood; Lawrence J. Kusan, Glendale Heights; Dinesh K. Srivastava, Westmont, all of Ill.

[73] Assignee: GTE Automatic Electric Laboratories Incorporated, Northlake, Ill.

[22] Filed: Dec. 22, 1975

[21] Appl. No.: 643,434

[52] U.S. Cl. .................... 179/18 AH; 179/16 E
[51] Int. Cl.² .................... H04M 7/14; H04Q 3/62
[58] Field of Search ........ 179/18 AH, 18 AD, 16 E

[56] References Cited
UNITED STATES PATENTS 3,544,730  12/1970  Voss .................. 179/18 AH X Primary Examiner—William C. Cooper
Attorney, Agent, or Firm—Robert J. Black

[57] ABSTRACT

An arrangement and method for providing a dial pulse muting function to prevent the sender outpulsing from being heard is to disable the sampling of the transmit to the network side of the trunk circuit which is connected through the time switch and to the receiver from the network side of the line circuit. This function takes place in the trunk circuit, rather than the line circuit, so that less equipment is required. The function, furthermore, is provided through the use of integrated circuit chips as opposed to relays so that less space is required and the arrangement is far more reliable.

7 Claims, 1 Drawing Figure

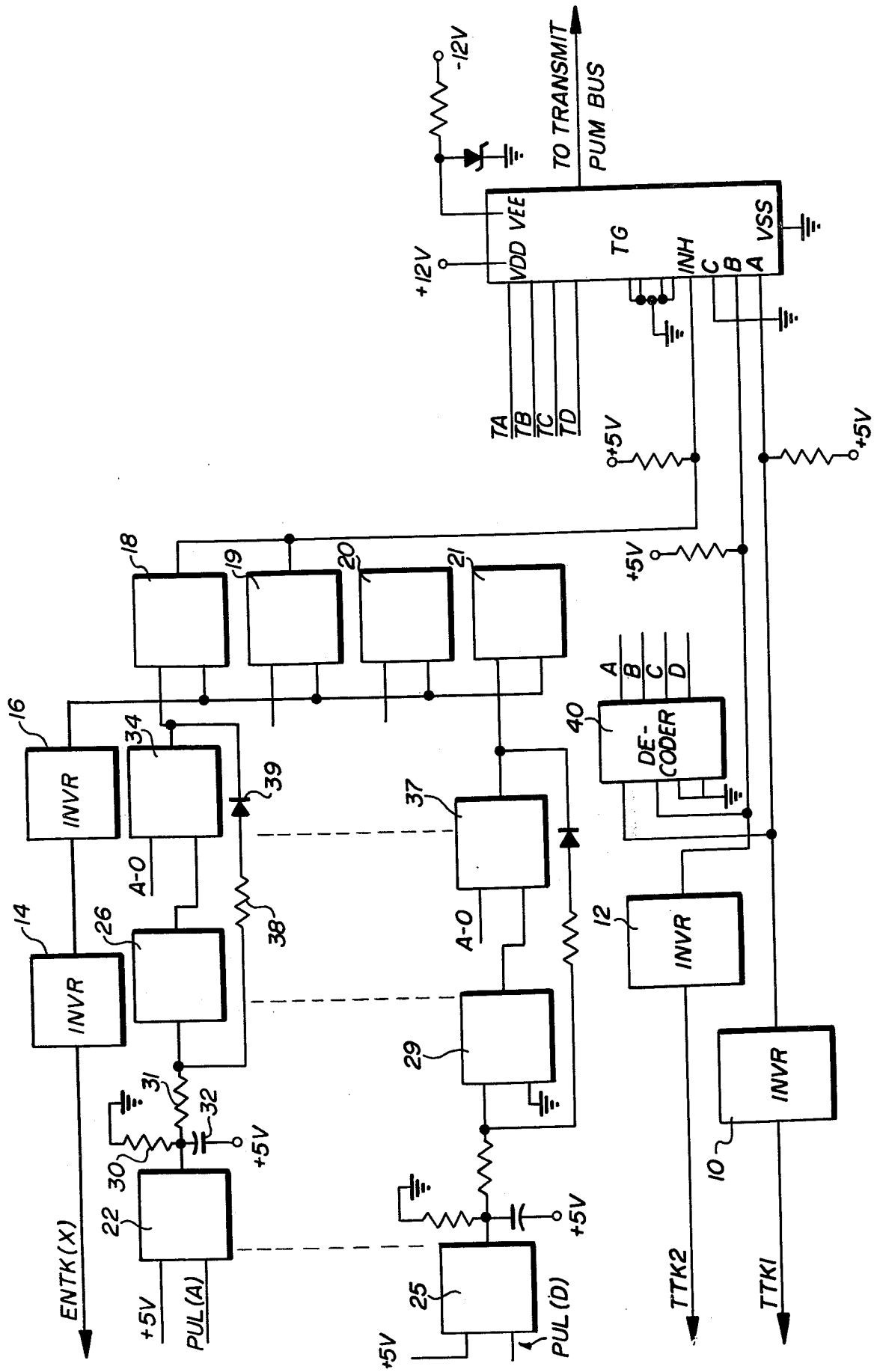

ARRANGEMENT AND METHOD OF ACHIEVING A DIAL PULSE MUTING FUNCTION IN A REGISTER SENDER PABX SYSTEM

BACKGROUND OF THE INVENTION

This invention relates to an arrangement and method of achieving a dial pulse muting function in a register sender PABX system.

In present day PABX systems using direct drive (no register senders), the dial springs of the telephone short the receiver so that pulsing is not heard by the originating station. However, in register sender PABX systems, particularly those which must receive a full digit before sending pulses forward on a trunk, it is possible for the dial springs to return to normal and for the receiver to be across the loop when the sender is outpulsing. In such cases, the outpulsing will be heard by the originator. In a copending U.S. patent application, Ser. No. 614,407, filed on Sept. 18, 1975, by Donald W. McLaughlin, said application and the present application both being assigned to the same assignee, there is disclosed a PCM PABX system in which such a situation could exist. In the system disclosed in this copending application, dial pulses are accumulated and stored by the software in the central processor and a full digit must be received before it is outpulsed to the central office. After a delay of approximately 300 miliseconds, during which time the dial pulses are being accumulated, the sender outpulses the full digit. If the trunk circuit is sampled at this time, these dial pulses are fowarded through the system to the time switch (a memory). Subsequently, these dial pulses are returned to the subscriber's line circuit and will be heard by the subscriber. It is preferred that these dial pulses not be heard.

Accordingly, it is an object of the present invention to provide an arrangement and method for providing a dial pulse muting function in register sender PABX systems for preventing sender outpulsing from being heard.

SUMMARY OF THE INVENTION

The arrangement and method of the present invention for providing a dial pulse muting function to prevent the sender outpulsing from being heard is to disable the sampling of the transmit to the network side of the trunk circuit which is connected through the time switch and to the receiver from the network side of the line circuit. This function takes place in the trunk circuit, rather than the line circuit, so that less equipment is required. The function, furthermore, is provided through the use of integrated circuit chips as opposed to relays so that less space is required and the arrangement is far more reliable.

BRIEF DESCRIPTION OF THE DRAWINGS

The drawing is a block diagram schematic generally representing a portion of a trunk circuit card, illustrating the arrangement and method of providing a dial pulse muting function, in accordance with the invention.

DETAIL DESCRIPTION

In a typical PCM PABX system, the analog information from a subscriber is coupled through a line circuit and/or trunk circuit, depending upon the destination of the call, and these line and trunk circuits are of generally the same configuration. In each, the analog information is amplified by a transmit amplifier and then filtered before being coupled to a transmit gate, from where it is coupled to a PAM bus to an A/D converter. The A/D converter accepts the PAM bus, and outputs a binary representation for each PAM sample. The information from all such A/D converters is multiplexed to form a single PCM bus to a time switch, which is usually a memory for switching in time the PCM information that is received.

Correspondingly, the output PCM information from the time switch is coupled to the PCM bus and is demultiplexed into separate 24 channel buses for the D/A converters, which convert the PCM into individual PAM samples on the PAM buses. The PAM samples are received by the appropriate line or trunk circuits, via a receive gate. After being filtered by a filter and then amplified by a receive amplifier, an analog waveform is coupled to the subscriber.

In such systems, the line or trunk interfaces include means for enabling the transmit and receive gates, to allocate the line or trunk circuits to the available channels.

As indicated above, if the system is a register sender system, and particularly one which must receive a full digit before sending pulses forward on a trunk, it is possible for the subscriber to hear the sender outpulsing. The outpulsing generally is provided by a pulsing relay which has a contact included in the trunk circuit, and is driven by a relay driver. Most such pulsing relays, upon being de-energized, restore in approximately 1 millisecond.

In accordance with the invention, the subscriber is prevented from hearing sender outpulsing, by disabling the transmit gate until the pulsing relay has closed, i.e., the transmit gate is enabled after the pulsing relay is closed, and then disabling the transmit gate before the pulsing relay is restored to outpulse a digit or pulse.

More particularly, the arrangement and method of providing the dial pulse muting function can be better understood by referring to the drawing which generally represents a portion of a trunk card typical of the type used in many such systems, with only those elements of the trunk circuits, and the transmit gate associated with them, necessary for an understanding of the invention being illustrated.

As in most systems, the trunk card contains four trunk circuits, with one lead from the transmit filters of each being coupled to the transmit gate associated with those trunk circuits. In the drawing, these leads from the trunk circuits are represented by the designations TA, TB, TC and TD shown coupled to the transmit gate TG, which may be a typical transmit gate of the type manufactured by RCA, such as, for example, a type CD4051-AE, or its equivalent. The transmit gate TG has an inhibit input INH which, when high or at a logic 1, disables the gate and which, when low or at a logic 0, enables the gate to couple signals onto the PAM transmit bus. Selection of one of the many trunk cards is accomplished by a signal coupled to the card enable lead ENTK($x$) and, in the illustrated case, a card is selected or identified by a high or logic 1 signal on this card enable lead ENTK($x$). Correspondingly, one of the four trunk circuits TA-TD is selected or identified by BCD signals coupled to the leads TTK1 and TTK2, to the transmit gate TG. This selection or enabling technique is well-known in the art, and forms no part of the present invention.

The card enable signal on the card enable lead ENTK(x), rather than being directly coupled to the inhibit input INH of the transmit gate TG, in this case, is coupled through a pair of inverters 14 and 16, to one input of each of the four NAND gates 18-21 which may be type 7426 NAND gates or their equivalents. The output of each of these NAND gates 18-21 is coupled to the inhibit input INH of the transmit gate TG.

The output leads from the relay drivers which drive the pulsing relays associated with each of the trunk circuits also are coupled to the respective inputs of the switches 22-25 (only 2 of which are shown), which input leads are designated PUL(A)-PUL(D), respectively. The switch 22, together with a time delay circuit comprising the resistors 30 and 31 and the capacitor 32, a pair of NOR gates 26 and 34, and a resistor 38 and diode 39 bridging the NOR gates 26 and 34, form a monostable multivibrator type of circuit that is triggered by the input on the PUL(A) lead to provide a delayed output signal and an instantaneous removal of the signal when the input signal is removed.

More specifically, when the signal on the PUL(A) lead goes low (logic 0), the switch 22 is operated to switch the +5 volt through to the time delay circuit which, in the instant case, provides a delay of approximately 300 milliseconds. The NOR gates 26 and 34 are gated to provide a high (logic 1) output (after the delay) if the signal on the lead A to the NOR gate is low (logic 0). When the input PUL(A) goes high (logic 1), the output of the NOR gate 34 immediately goes low (logic 0). The switches 23-25 associated with the other three trunk circuits form the same arrangement.

The switches 22-25 can be a type CD4016 COS/MOS Quad Bilateral switch or its equivalent, while the NOR gates 26-29 and 34-37 can be type CD4001A COS/-MOS NOR gates or their equivalents.

The trunk selection or identity signals on the leads TTK1 and TTK2 are coupled through the respective inverters 10 and 12 to the transmit gate TG, and also to a BCD to decimal decoder 40 which may be, for example, a type 4110 decoder. The decoder's outputs A, B, C and D are coupled to the respective ones of the NOR gates 34-37.

Now, for the purpose of illustrating the operation of the above-described arrangement, assume that the illustrated trunk card and the trunk circuit TA on the card are selected. In this case, the signal on the card enable lead ENTK(x) will be high (logic 1), and the output of the inverter 16 to the NAND gates 18-21 will be high (logic 1). The signals on the trunk selection or identity leads TTK1 and TTK2 are low (logic 0); and the outputs from the inverters 10 and 12 to the decoder 40 and the transmit gate T6 are high (logic 1). Since it is assumed that trunk circuit TA is selected, the transmit gate TG is enabled to couple trunk circuit TA onto the PAM transmit bus, and the A output of the decoder 40 will be low (logic 0).

At this time, the signal on the PUL(A) lead is high (logic 1), and the output of the gate 34 to the NAND gate 18 is low (logic 0). The output of the NAND gate 18 therefore is high (logic 1), and the signal on the inhibit lead INH is high (logic 1), thus inhibiting or disabling the transmit gate TG.

When PUL(A) goes low (logic 0), indicating that the pulsing relay is to close, i.e., the output from the relay driver to the pulsing relay, the switch 22 is operated to couple the +5 volts through it to its output and, after a 300 millisecond delay, the output of the gate 34 goes high (logic 1). Both inputs to the NAND gate 18 now are high (logic 1), and its output to the inhibit lead INH goes low (logic 0), thus enabling the transmit gate TG. However, in the meantime, before the transmit gate TG is enabled, the pulsing relay has operated.

As is normally the case, pulsing is accomplished by restoring the pulsing relay. The signal on the PUL(A) lead, therefore, now goes low (logic 0), indicating that the pulsing relay is to restore. The switch 22 immediately operates, and the output of the gate 34 to the NAND gate 18 immediately goes low (logic 0) and the output of the NAND gate 18 goes high (logic 1), thus again inhibiting or disabling the transmit gate TG. The transmit gate TG therefore is disabled as soon as the PUL(A) lead goes high (logic 1), however, the release time of the pulsing relay is much slower (approximately 1 millisecond) so that the transmit gate is disabled before the pulsing relay can restore.

When the pulsing relay is again operated, PUL(A) goes low (logic 0). After the 300 millisecond delay, the transmit gate TG again is enabled, as described above. When PUL(A) goes high (logic 1), but before the pulsing relay drops, the transmit gate TG again is disabled.

Accordingly, from the above description, it is apparent that the transmit gate TG is disabled so as to inhibit sampling while the pulsing relay is pulsing. Pulsing noise therefore will not be heard. The only signal which will be encoded and stored in the time switch (memory) and subsequently passed on to be decoded and heard at the line circuit is the amount of signal on the PAM transmit bus with no one enabled, which signal should be a very quiet signal.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawing shall be interpreted as illustrative and not in a limiting sense.

Now that the invention has been described, what is claimed as new and desired to be secured by Letters Patent is:

1. In a private automatic branch exchange telephone system of the register sender type having a plurality of trunk cards, each of said trunk cards having thereon a transmit gate, a receive gate and a plurality of trunk circuits, said trunk circuits on a trunk card each being selectively connectable via the transmit gate and the receive gate to a transmit bus and a receive bus, respectively, for extending calls from subscriber's line circuits and each including a pulse relay and a relay driver for operating the pulsing relay to generate dial pulses, a dial pulse being generated when a pulsing relay restores after being operated, each of the transmit and receive gates having an inhibit input and trunk identity inputs, a trunk circuit on a trunk card normally being selected and identified by coded signals coupled to the trunk identity inputs and a card enable signal coupled to the inhibit input, the improvement comprising a dial pulse muting arrangement for preventing a subscriber from hearing sender outpulsing, said arrangement comprising a first and a second gating means associated with each of said trunk circuits, the output of each of said first gating means being coupled to an input of said second gating means, the outputs of said second gating means all being coupled to said inhibit input of said transmit gate, said relay driver being coupled to and operating said first gating means to provide an output signal to said second gating means each time said relay driver is operated to operate said pulsing relay to close its contacts, said output signal to said second gating means being a delayed output signal and being removed substantially immediately when said relay driver releases said pulsing relay permitting it to restore, said card enable signal being coupled to another input of said second gating means and said second gating means being operated upon receipt in coincidence of said delayed output signal from said first gating means and said card enable signal to provide an output signal to said inhibit input of said transmit gate to enable said transmit gate, each time a pulsing relay associated with a selected trunk circuit on a selected trunk card is operated by its associated relay driver, said first gating means to which said relay driver is coupled being operated to provide said delayed output signal to said second gating means to thereby enable the latter to provide said output signal to said inhibit input of said transmit gate to enable said transmit gate, said first gating means removing said delayed output signal when said relay driver releases said pulsing relay so that said transmit gate is disabled before said pulsing relay can be restored, whereby said transmit gate is enabled after a pulsing relay restores.

2. The improvement of claim 1, wherein said delayed output signal is delayed for a time substantially corresponding to the time required for the dial pulses to be accumulated by a sender in said system.

3. The improvement of claim 1, wherein said delayed output signal is delayed for approximately 300 milliseconds.

4. The improvement of claim 1, wherein said first gating means functions substantially like a monostable multivibrator which is gated by a delayed signal.

5. The improvement of claim 1, further including decoder means for decoding said coded signals coupled to said trunk identity inputs and for providing trunk selected output signals, said trunk selected output signals being coupled to respective ones of said first gating means to gate said delayed output signal to the associated one of said second gating means.

6. The improvement of claim 1, wherein said second gating means each comprises a NAND gate.

7. In a private automatic branch exchange telephone system of the register sender type having a plurality of trunk cards, each of said trunk cards having thereon a transmit gate, a receive gate and a plurality of trunk circuits, said trunk circuits on a trunk card each being selectively connectable via the transmit gate and the receive gate to a transmit bus and a receive bus, respectively, for extending calls from subscriber's line circuits and each including a pulsing relay and a relay driver for operating the pulsing relay to generate dial pulses, a dial pulse being generated when a pulsing relay restores after being operated, each of the transmit and receive gates having an inhibit input and trunk identity inputs, a trunk circuit on a trunk card normally being selected and identified by coded signals coupled to the trunk identity inputs and a card enable signal coupled to the inhibit input, the improvement comprising a method for providing a dial pulse muting function to prevent a subscriber from hearing sender outpulsing, said method comprising the steps of providing a first and a second gating means for each of said trunk circuits, operating said first gating means to provide a delayed output signal to said second gating means each time said relay driver is operated to operate said pulsing relay to close its contacts and removing said delayed output signal substantially immediately when said relay driver releases said pulsing relay permitting it to restore, coupling said card enable signal to another input of each of said second gating means and said second gating means each being operated upon receipt in coincidence of said delayed output signal from its associated first gating means and said card enable signal to provide an output signal to said inhibit input of said transmit gate to enable said transmit gate, whereby each time a pulsing relay associated with a selected trunk circuit on a selected trunk card is operated by its associated relay driver, the first gating means to which said relay driver is coupled is operated to provide said delayed output signal to said second gating means and the latter is enabled to provide said output signal to said inhibit input of said transmit gate to enable said transmit gate and said delayed output signal is removed by said first gating means when said relay driver releases said pulsing relay so that said transmit gate is disabled before said pulsing relay can be restored, said transmit gate thereby being enabled after a pulsing relay is operated and being disabled before said pulsing relay restores.

* * * * *